United States Patent
Anraku et al.

(10) Patent No.: US 11,787,465 B2
(45) Date of Patent: Oct. 17, 2023

(54) STEERING CONTROL APPARATUS

(71) Applicant: JTEKT CORPORATION, Osaka (JP)

(72) Inventors: Koji Anraku, Okazaki (JP); Isao Namikawa, Okazaki (JP); Takuji Yoshida, Toyota (JP); Masahide Nitano, Toyota (JP)

(73) Assignee: JTEKT CORPORATION, Kariya (JP)

( * ) Notice: Subject to any disclaimer, the term of this patent is extended or adjusted under 35 U.S.C. 154(b) by 286 days.

(21) Appl. No.: 17/180,973

(22) Filed: Feb. 22, 2021

(65) Prior Publication Data
US 2021/0269086 A1 Sep. 2, 2021

(30) Foreign Application Priority Data
Mar. 2, 2020 (JP) .................... 2020-034892

(51) Int. Cl.
*B62D 6/00* (2006.01)
*B62D 5/04* (2006.01)
*B62D 5/00* (2006.01)

(52) U.S. Cl.
CPC ........... *B62D 5/0481* (2013.01); *B62D 5/001* (2013.01)

(58) Field of Classification Search
CPC .... B62D 5/0481; B62D 5/001; B62D 5/0469; B62D 5/0418; B62D 6/00
USPC ........................................................ 701/41
See application file for complete search history.

(56) References Cited

U.S. PATENT DOCUMENTS

| | | | | |
|---|---|---|---|---|
| 10,414,429 | B2* | 9/2019 | Nozawa | B62D 5/049 |
| 11,383,760 | B2* | 7/2022 | Nakade | B62D 5/001 |
| 11,440,580 | B2* | 9/2022 | Kim | B62D 5/0409 |
| 2019/0135334 | A1* | 5/2019 | Itamoto | B62D 15/025 |
| 2021/0213935 | A1* | 7/2021 | Lu | B60W 10/18 |
| 2022/0041207 | A1* | 2/2022 | Tae | B62D 5/0484 |

FOREIGN PATENT DOCUMENTS

| | | | |
|---|---|---|---|
| DE | 10121873 A1 * | 11/2002 | ........... B62D 5/0469 |
| DE | 10121873 A1 | 11/2002 | |
| DE | 102006031716 A1 | 1/2008 | |
| JP | 2015-128943 A | 7/2015 | |

OTHER PUBLICATIONS

Jul. 21, 2021 Extended European Search Report issued in European Patent Application No. 21159198.7.

\* cited by examiner

*Primary Examiner* — Shardul D Patel
(74) *Attorney, Agent, or Firm* — Oliff PLC (57) ABSTRACT

A steering control apparatus is configured to control a steering system having a structure in which a power transmission path between a steering mechanism and a steering operation mechanism including a motor configured to generate a motor torque is separated. The steering control apparatus includes a controller configured to control driving of the motor. The controller detects an abnormality of the steering operation mechanism when a value indicating a variation in the motor torque is a value indicating a state in which a steering operation shaft is presumed to be immovable though the motor torque is applied.

5 Claims, 3 Drawing Sheets

STEERING CONTROL APPARATUS

CROSS-REFERENCE TO RELATED APPLICATION

This application claims priority to Japanese Patent Application No. 2020-034892 filed on Mar. 2, 2020, incorporated herein by reference in its entirety.

BACKGROUND

1. Technical Field

The present disclosure relates to a steering control apparatus.

2. Description of Related Art

Steering systems for use in vehicles include a steering mechanism and a steering operation mechanism. The steering mechanism is steered by a driver. The steering operation mechanism turns steered wheels of the vehicle in relation to movement of a steering operation shaft using a motor torque as power. The motor torque is power output from a motor. Japanese Unexamined Patent Application Publication No. 2015-128943 (JP 2015-128943 A) discloses an example of a steering control apparatus configured to control driving of the motor of the steering system. This steering control apparatus is configured such that a mechanical abnormality of the steering operation mechanism is detected and the driver is alerted.

In JP 2015-128943 A, an abnormality of the steering operation shaft is detected as the mechanical abnormality of the steering operation mechanism by using, in particular, a detection result from a torque sensor provided in the steering mechanism of the steering system.

SUMMARY

The detection of the mechanical abnormality of the steering operation mechanism is particularly important in a so-called steer-by-wire type steering system having a structure in which a power transmission path between the steering operation mechanism and the steering mechanism is separated. This is because the driver is not informed via the steering mechanism about a situation in which a mechanical abnormality has occurred in the steering operation mechanism.

The present disclosure provides a steering control apparatus in which a mechanical abnormality of a steering operation mechanism can be detected in a steer-by-wire type steering system.

A steering control apparatus according to an aspect of the present disclosure is configured to control a steering system having a structure in which a power transmission path between a steering mechanism and a steering operation mechanism is separated. The steering mechanism is steered by a driver. The steering operation mechanism includes a motor configured to generate a motor torque serving as power for moving a steering operation shaft to turn a steered wheel of a vehicle. The steering control apparatus includes a controller configured to control driving of the motor to generate the motor torque. The controller is configured to detect an abnormality of the steering operation mechanism when a value indicating a variation in the motor torque is a value indicating a state in which the steering operation shaft is presumed to be immovable though the motor torque is applied.

According to the aspect described above, for example, a value that serves as the value indicating the variation in the motor torque and indicates a state in which a gradient of the variation abruptly increases can be set as the value indicating the state in which the steering operation shaft is presumed to be immovable though the motor torque is applied. The gradient of the variation in the motor torque may abruptly increase in a state in which the steering operation shaft cannot be moved though the motor torque is applied. The state in which the steering operation shaft cannot be moved though the motor torque is applied includes a possibility that the abnormality occurs in the steering operation mechanism and the steering operation shaft cannot be moved mechanically. That is, the mechanical abnormality of the steering operation mechanism can be detected in the configuration described above. Thus, the mechanical abnormality of the steering operation mechanism can be detected in the so-called steer-by-wire type steering system.

In the aspect described above, the controller may be configured to detect the abnormality of the steering operation mechanism through comparison between a value that is calculated as the value indicating the variation in the motor torque and corresponds to a gradient of the variation and a gradient threshold defined to indicate the state in which the steering operation shaft is presumed to be immovable though the motor torque is applied.

The state in which the steering operation shaft cannot be moved though the motor torque is applied includes a state in which the steering operation shaft cannot be moved due to contact between the steered wheel and an obstacle such as a curbstone. This state is unlikely to occur when a speed of the vehicle is higher than a low speed.

In the aspect described above, the controller may be configured to detect the abnormality of the steering operation mechanism when a speed of the vehicle is a value indicating that the speed is higher than a low speed including a stop of the vehicle.

According to the configuration described above, it is possible to reduce erroneous determination that the abnormality occurs in the steering operation mechanism because of the state in which the steering operation shaft cannot be moved due to the contact between the steered wheel and an obstacle such as a curbstone. Thus, this configuration is effective in terms of an increase in the accuracy of the detection of the abnormality of the steering operation mechanism.

The state in which the steered wheel is in contact with an obstacle such as a curbstone can be estimated based on a track of a change amount of the motor torque. In the aspect described above, the value indicating the state in which the steering operation shaft is presumed to be immovable though the motor torque is applied may be set to a value larger than a value determined by a characteristic of a change in the motor torque that is estimated based on an elastic component of the steered wheel and an elastic component of the vehicle.

According to the configuration described above, the erroneous detection of the abnormality can be reduced with high accuracy, and the accuracy of the detection of the abnormality of the steering operation mechanism can be increased. The state in which the steering operation shaft cannot be moved though the motor torque is applied includes a state that instantaneously occurs due to influence of a road condition or influence of instantaneous contact between the vehicle and an obstacle such as a curbstone during traveling.

In the aspect described above, the controller may be configured to detect the abnormality of the steering operation mechanism when the value indicating the variation in the motor torque continues, for a preset threshold time, to be the value indicating the state in which the steering operation shaft is presumed to be immovable though the motor torque is applied.

According to the configuration described above, the erroneous detection of the abnormality can be reduced with high accuracy, and this configuration is effective in terms of an increase in the accuracy of the detection of the abnormality of the steering operation mechanism. The state in which the steering operation shaft cannot be moved though the motor torque is applied includes a state in which the steering operation shaft cannot be moved due to limitation on power output from the motor. This state can be grasped based on a control state of the motor.

In the aspect described above, the controller may be configured to detect the abnormality of the steering operation mechanism when a control state of the motor is not a limiting state in which power output from the motor is limited.

According to the configuration described above, the erroneous detection of the abnormality can be reduced with high accuracy, and this configuration is effective in terms of an increase in the accuracy of the detection of the abnormality of the steering operation mechanism.

According to the steering control apparatus of the aspect described above, the mechanical abnormality of the steering operation mechanism can be detected in the steer-by-wire type steering system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
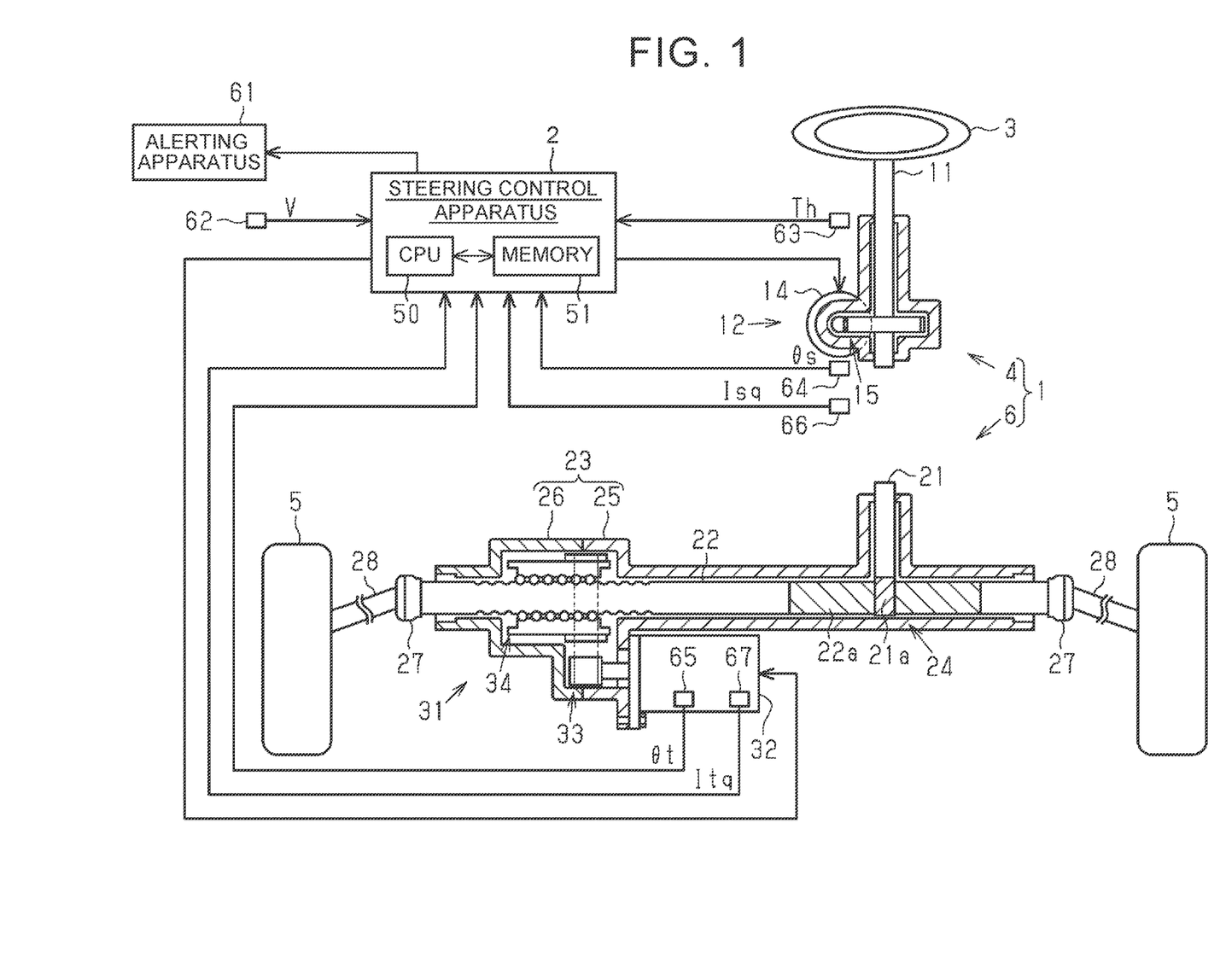
FIG. 1 is a schematic structural diagram of a steering system.

An embodiment in which a steering control apparatus is applied to a steer-by-wire type steering system is described below with reference to the drawings. As illustrated in FIG. 1, a steering system 1 of this embodiment is a steer-by-wire type steering system. The steering system 1 includes a steering control apparatus 2 configured to control operations of the steering system 1. The steering system 1 includes a steering mechanism 4 and a steering operation mechanism 6. The steering mechanism 4 is steered by a driver via a steering wheel 3. The steering operation mechanism 6 turns steered wheels 5 in response to a drivers steering operation for the steering mechanism 4. The steering system 1 of this embodiment has a structure in which a power transmission path between the steering mechanism 4 and the steering operation mechanism 6 is constantly separated mechanically.

The steering mechanism 4 includes a steering shaft 11 and a steering-side actuator 12. The steering wheel 3 is coupled to the steering shaft 11. The steering-side actuator 12 applies a steering reaction force to the steering wheel 3 via the steering shaft 11 as a force for resisting a steering operation.

The steering-side actuator 12 includes a steering-side motor 14 and a speed reducer 15. The steering-side motor 14 serves as a drive source. The speed reducer 15 includes a worm and a wheel. The steering-side motor 14 is coupled to the steering shaft 11 via the speed reducer 15.

The steering operation mechanism 6 includes a pinion shaft 21, a rack shaft 22, a rack housing 23, and a rack and pinion mechanism 24. The rack shaft 22 serves as a steering operation shaft coupled to the pinion shaft 21. The rack housing 23 houses the rack shaft 22 so that the rack shaft 22 is reciprocable in an axial direction. The rack and pinion mechanism 24 includes the pinion shaft 21 and the rack shaft 22. The rack housing 23 includes a first housing 25 and a second housing 26 each having a cylindrical shape. The rack shaft 22 and the pinion shaft 21 are arranged in the first housing 25 at a predetermined crossing angle. The rack and pinion mechanism 24 is structured such that pinion teeth 21a of the pinion shaft 21 mesh with rack teeth 22a of the rack shaft 22. Tie rods 28 are coupled to both ends of the rack shaft 22 via rack ends 27 that are ball joints. Distal ends of the tie rods 28 are coupled to knuckles (not illustrated) to which the steered wheels 5 are attached.

The pinion shaft 21 is provided to support the rack shaft 22 in the rack housing 23. That is, a support mechanism (not illustrated) provided in the steering operation mechanism 6 supports the rack shaft 22 so that the rack shaft 22 is movable along a direction of its axis, and presses the rack shaft 22 toward the pinion shaft 21. Thus, the rack shaft 22 is supported in the rack housing 23. Further, rotation of the rack shaft 22 is restricted. Another support mechanism may be provided to support the rack shaft 22 in the rack housing 23 without using the pinion shaft 21. In this case, the steering operation mechanism 6 may have a structure in which the pinion shaft 21 is omitted.

The steering operation mechanism 6 further includes a steered-side actuator 31 configured to apply, to the rack shaft 22, power for moving the rack shaft 22 in the axial direction to turn the steered wheels 5. The steered-side actuator 31 includes a steered-side motor 32 serving as a drive source, a belt mechanism 33, and a ball screw mechanism 34. The steered-side actuator 31 is provided at a coupling portion between the first housing 25 and the second housing 26. The steered-side actuator 31 applies power to the rack shaft 22 such that rotation of the steered-side motor 32 is transmitted to the ball screw mechanism 34 via the belt mechanism 33 and the ball screw mechanism 34 converts the rotation into reciprocal motion in the axial direction of the rack shaft 22.

In the steering system 1 having the structure described above, a motor torque is applied from the steered-side actuator 31 to the rack shaft 22 as power in response to a driver's steering operation to change a steering angle of each steered wheel 5. At this time, a steering reaction force that resists the driver's steering operation is applied from the steering-side actuator 12 to the steering wheel 3.

As illustrated in FIG. 1, the steering control apparatus 2 is connected to the steering-side motor 14 and the steered-side motor 32 to control driving of the motors 14 and 32. The steering control apparatus 2 controls the driving of the motors 14 and 32 by controlling supply of currents that are control amounts of the motors 14 and 32 based on detection results from various sensors. Examples of various sensors include a vehicle speed sensor 62, a torque sensor 63, a steering-side rotation angle sensor 64, a steered-side rotation angle sensor 65, a steering-side current sensor 66, and a steered-side current sensor 67.

The vehicle speed sensor 62 detects a vehicle speed value V that is a traveling speed of a vehicle. The torque sensor 63 detects a steering torque Th applied to the steering shaft 11 through a driver's steering operation. The steering-side rotation angle sensor 64 detects a steering angle θs that is a rotation angle of a rotation shaft of the steering-side motor 14. The steered-side rotation angle sensor 65 detects a steered angle θt that is a rotation angle of a rotation shaft of the steered-side motor 32. The steering-side current sensor 66 acquires, as a current, a voltage drop of a shunt resistor connected to sources of switching elements of an inverter (not illustrated) provided in association with the steering-side motor 14, and detects the current as an actual current value Isq indicating the magnitude of a motor torque that is power output from the steering-side motor 14. The steered-side current sensor 67 acquires, as a current, a voltage drop of a shunt resistor connected to sources of switching elements of an inverter (not illustrated) provided in association with the steered-side motor 32, and detects the current as an actual current value Itq indicating the magnitude of a motor torque that is power output from the steered-side motor 32.

For example, an alerting apparatus 61 provided on an instrument panel in the vehicle is connected to the steering control apparatus 2. The alerting apparatus 61 alerts the driver by lighting or blinking. In this embodiment, the alerting apparatus 61 alerts the driver to the occurrence of a mechanical abnormality of the steering operation mechanism 6.

Next, the configuration of the steering control apparatus 2 is described. As illustrated in FIG. 1, the steering control apparatus 2 includes a central processing unit (hereinafter referred to as "CPU") 50 and a memory 51. The CPU 50 executes programs stored in the memory 51 in every predetermined calculation period to execute various types of control including the control on the driving of the motors 14 and 32 for generating motor torques. In this embodiment, the CPU 50 is an example of a controller.

Specifically, the CPU 50 calculates a target reaction torque that is a target value of the steering reaction force to generate the steering reaction force in response to a driver's steering operation. For example, the CPU 50 calculates the target reaction torque based on the steering torque Th and the vehicle speed value V. The CPU 50 controls the driving of the steering-side motor 14 by supplying driving electric power to the steering-side motor 14 to generate a motor torque associated with the target reaction torque based on the steering angle θs and the actual current value Isq of the steering-side motor 14. In this manner, the steering reaction force is generated in the steering mechanism 4.

The CPU 50 counts the number of revolutions of the steered-side motor 32 from a middle point θt0 based on the steered angle θt of the steered-side motor 32, and calculates a cumulative angle that is the sum of the steered angles θt from the middle point θt0 as the origin. The middle point θt0 is a steered angle θt when the vehicle travels straightforward, and corresponds to a middle point of a pinion angle. The CPU 50 calculates a pinion angle θp as the steering angle of each steered wheel 5 by multiplying the cumulative angle by a conversion factor K that is based on a speed reducing ratio of the belt mechanism 33, a lead of the ball screw mechanism 34, and a rotation speed ratio of the rack and pinion mechanism 24. The pinion angle θp indicates a rotation angle of the pinion shaft 21. For example, the pinion angle θp is positive on a left side of a middle point θp0, and is negative on a right side of the middle point θp0.

The CPU 50 calculates a target pinion angle θp* that is a target value of the pinion angle θp so that the pinion angle θp reaches an angle responding to a driver's steering operation. For example, the CPU 50 calculates the target pinion angle θp* based on the steering angle θs so that the pinion angle θp has the same value as that of the steering angle θs. The CPU 50 calculates a target steering operation torque that is a target value of power by executing feedback control to cause the pinion angle θp to follow the target pinion angle θp*. The CPU 50 controls the driving of the steered-side motor 32 by supplying driving electric power to the steered-side motor 32 to generate a motor torque associated with the target steering operation torque based on the steered angle θt and the actual current value Itq of the steered-side motor 32. In this manner, the power is generated in the steering operation mechanism 6.

Next, description is given of a process to be executed by the CPU 50 to detect a mechanical abnormality of the steering operation mechanism 6. In the following description, the CPU 50 executes the process for detecting the mechanical abnormality of the steering operation mechanism 6 by executing a periodic process in every control period based on a program stored in the memory 51. In this embodiment, an abnormality to be detected as the mechanical abnormality of the steering operation mechanism 6 is a state in which the rack shaft 22 cannot be moved though the motor torque is applied despite the fact that an obstacle such as a curbstone is not in contact with the steered wheel 5.

Figure 2:
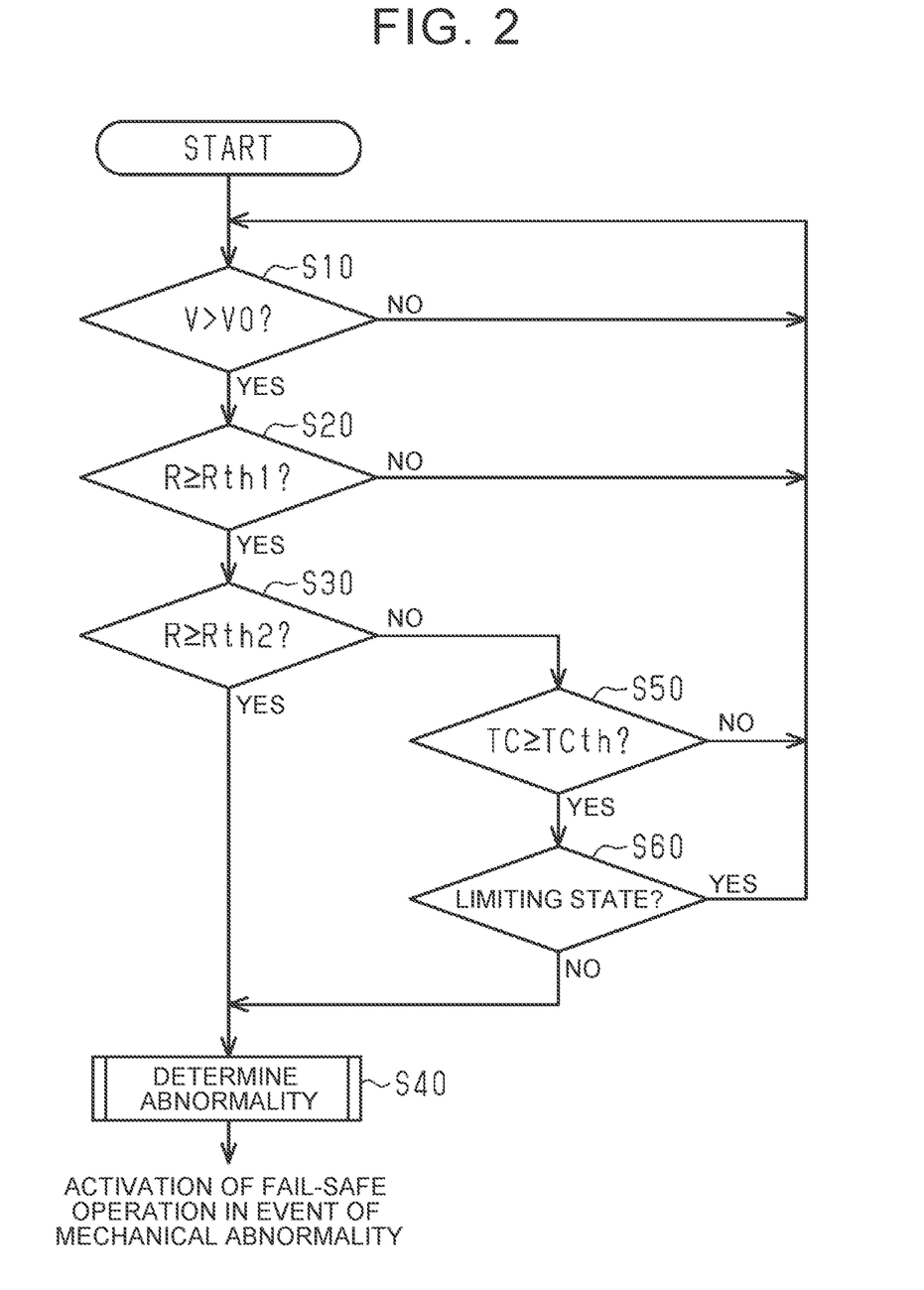
FIG. 2 is a flowchart illustrating a procedure of a process for determining the occurrence of an abnormality in a steering operation apparatus.

As illustrated in FIG. 2, the CPU 50 determines whether the vehicle speed value V is larger than a predetermined low-speed value V0 (V>V0) (Step S10). The low-speed value V0 is preset to indicate that the vehicle is at a low speed including a stop. This process is executed to determine whether the vehicle is traveling at a low speed including a stop, for example, at several kilometers per hour. This is a condition set on the ground that the state in which the vehicle is traveling at a speed higher than a low speed is unlikely to cause a state in which the rack shaft 22 cannot be moved due to contact between the steered wheel 5 and an obstacle such as a curbstone. When the CPU 50 determines that the vehicle speed value V is equal to or smaller than the low-speed value V0 (Step S10: NO), the CPU 50 determines that the vehicle is traveling at a low speed including a stop, and returns to the process of Step S10 to repeat the process.

When the CPU 50 determines that the vehicle speed value V is larger than the low-speed value V0 (Step S10: YES), the CPU 50 determines that the vehicle is traveling at a speed higher than a low speed including a stop, and compares a torque gradient R to a gradient threshold Rth1 (Step S20). The torque gradient R is a value that is calculated as a value indicating a variation in the actual current value Itq and indicates a gradient of the variation. This process is executed to determine whether a gradient of a variation in the motor torque of the steered-side motor 32 abruptly increases. The gradient of the variation in the motor torque of the steered-side motor 32 may abruptly increase in a state in which the rack shaft 22 cannot be moved though the motor torque is applied. The state in which the rack shaft 22 cannot be moved though the motor torque is applied includes a possibility that an abnormality occurs in the steering operation mechanism 6 and the rack shaft 22 cannot be moved mechanically. That is, the process of Step S20 is a process for detecting the mechanical abnormality of the steering operation mechanism 6.

In this embodiment, the torque gradient R is obtained by dividing a torque change amount ΔItq by the control period. The torque change amount ΔItq is a difference between a current value of the actual current value Itq and a previous value of the actual current value Itq that is earlier by one control period. When the control period is preset, the torque change amount ΔItq is a value indicating a variation in the actual current value Itq between the control periods and corresponding to the torque gradient R of the actual current value Itq. Therefore, the torque change amount ΔItq may be used in place of the torque gradient R in Step S20.

In Step S20, the CPU 50 determines whether the torque gradient R is equal to or larger than the gradient threshold Rth1 (R≥Rth1). The gradient threshold Rth1 is described.

Figure 3:
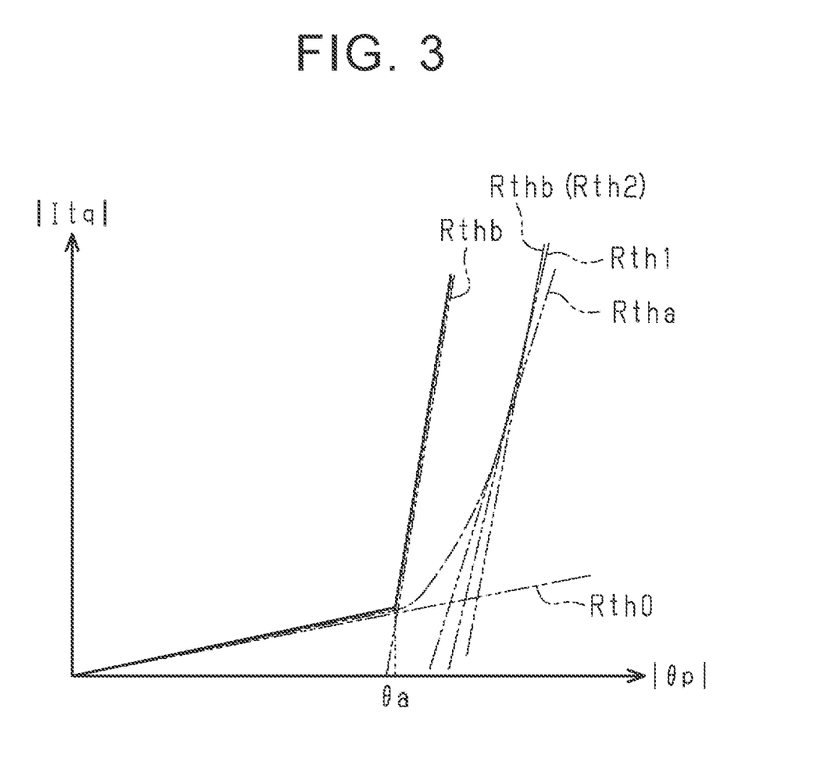
FIG. 3 is a schematic diagram for describing characteristics of a change in a motor torque.

As indicated by a dashed line in FIG. 3, characteristics of a change in the absolute value of the actual current value Itq corresponding to the motor torque of the steered-side motor 32 are defined such that the absolute value of the actual current value Itq continues to increase with a substantially constant gradient Rth0 along with an increase in the absolute value of the pinion angle θp when the steered wheel 5 is not in contact with an obstacle such as a curbstone and no mechanical abnormality occurs in the steering operation mechanism 6. As indicated by a continuous line in FIG. 3, the characteristics of the change in the absolute value of the actual current value Itq are defined such that the absolute value of the actual current value Itq increases with a gradient Rthb when a mechanical abnormality occurs in the steering operation mechanism 6. With the gradient Rthb, the absolute value of the actual current value Itq abruptly increases relative to the increase in the absolute value of the pinion angle θp after a certain angle θa. As indicated by a long dashed short dashed line in FIG. 3, the characteristics of the change in the absolute value of the actual current value Itq are defined such that the gradient exponentially increases relative to the increase in the absolute value of the pinion angle θp after the angle θa when the steered wheel 5 is in contact with an obstacle such as a curbstone at the angle θa. For example, the characteristics of the change in the absolute value of the actual current value Itq are defined such that the absolute value of the actual current value Itq increases with the gradient Rth0, then increases with a gradient Rtha represented by a tangent that is midway along the exponential increase, and eventually approximates to the state of the increase with the gradient Rthb. The characteristic of the change from the state of the increase with the gradient Rth0 to the state of the increase with the gradient Rtha can be determined experimentally depending on a characteristic that is based on an elastic component of rubber of each steered wheel 5 and a characteristic that is based on an elastic component of a suspension of the vehicle to which each steered wheel 5 is connected. In FIG. 3, the horizontal axis represents the absolute value of the pinion angle θp to collectively show the angles on both the right and left sides of the middle point θp0. In FIG. 3, the vertical axis represents the absolute value of the actual current value Itq to collectively show the actual current value Itq when the steered-side motor 32 rotates in the positive direction and the negative direction.

In this embodiment, the gradient threshold Rth1 is set to a value within a range in which the gradient is larger than the gradient Rtha and smaller than the gradient Rthb and is close to the gradient Rthb. The range is determined experimentally to indicate that the steered wheel 5 is not in contact with an obstacle such as a curbstone and a mechanical abnormality occurs in the steering operation mechanism 6.

The description resumes with reference to FIG. 2 again. When the CPU 50 determines in Step S20 that the torque gradient R is smaller than the gradient threshold Rth1 (Step S20: NO), the CPU 50 determines that no mechanical abnormality occurs in the steering operation mechanism 6, and returns to the process of Step S10 to repeat the processes of Step S10 and afterwards.

When the CPU 50 determines that the torque gradient R is equal to or larger than the gradient threshold Rth1 (Step S20: YES), the CPU 50 determines that a mechanical abnormality may occur in the steering operation mechanism 6, and determines whether the torque gradient R is equal to or larger than a gradient threshold Rth2 (Step S30). This process is executed to immediately determine that the mechanical abnormality occurs in the steering operation mechanism 6. In this embodiment, the gradient threshold Rth2 is set to a value larger than the gradient threshold Rth1 and equal to the gradient Rthb indicating that the mechanical abnormality occurs in the steering operation mechanism 6.

When the CPU 50 determines that the torque gradient R is equal to or larger than the gradient threshold Rth2 (Step S30: YES), the CPU 50 detects the mechanical abnormality of the steering operation mechanism 6, and executes a process related to abnormality determination to immediately determine the abnormality (Step S40). In Step S40, the CPU 50 controls a lighting condition to light or blink the alerting apparatus 61 in order to alert the driver that the mechanical abnormality of the steering operation mechanism 6 is detected. To record the detection of the mechanical abnormality of the steering operation mechanism 6, the CPU 50 records abnormality information indicating the detection in the memory 51. The abnormality information recorded in the memory 51 is output to a diagnosis tool (not illustrated) when the diagnosis tool is externally connected to the steering control apparatus 2. In this embodiment, the memory 51 has a diagnosis function. Then, the CPU 50 proceeds to a process for activating a fail-safe operation in the event of mechanical abnormality as a fail-safe operation. In this embodiment, the fail-safe operation in the event of mechanical abnormality involves executing a process for safely stopping the vehicle while alerting the driver.

When the CPU 50 determines in Step S30 that the torque gradient R is smaller than the gradient threshold Rth2 (Step S30: NO), the CPU 50 determines whether a duration TC is equal to or longer than a threshold time TCth (Step S50). The duration TC is a time during which the torque gradient R continues to be equal to or larger than the gradient threshold Rth1. This process is executed to determine whether the torque gradient R is instantaneously equal to or larger than the gradient threshold Rth1 due to influence of a road condition or influence of instantaneous contact between the vehicle and an obstacle such as a curbstone during traveling in order to exclude other factors in the mechanical abnormality of the steering operation mechanism 6 despite the possibility that the abnormality may occur. In this embodiment, the threshold time TCth is set to a value within a range determined experimentally to indicate that the torque gradient R is equal to or larger than the gradient threshold Rth1 due to the occurrence of the mechanical abnormality of the steering operation mechanism 6, instead of being instantaneously equal to or larger than the gradient threshold Rth1 due to the influence of the road condition or the influence of the instantaneous contact between the vehicle and an obstacle such as a curbstone during traveling.

When the CPU 50 determines in Step S50 that the duration TC is shorter than the threshold time TCth (Step S50: NO), the CPU 50 determines that the torque gradient R is instantaneously equal to or larger than the gradient threshold Rth1 due to the influence of the road condition or the influence of the instantaneous contact between the vehicle and an obstacle such as a curbstone during traveling. In this case, the CPU 50 returns to the process of Step S10 to repeat the processes of Step S10 and afterwards.

When the CPU 50 determines that the duration TC is equal to or longer than the threshold time TCth (Step S50: YES), the CPU 50 determines whether the control state of the steered-side motor 32 is a limiting state (Step S60). This process is executed to determine whether the torque gradient R is equal to or larger than the gradient threshold Rth1 due to the limiting state in which the power output from the steered-side motor 32 is limited in order to further exclude other factors in the mechanical abnormality of the steering operation mechanism 6 despite the possibility that the abnormality may occur. In this embodiment, the limiting state is assumed as a state to be set in a situation in which the power output from the steered-side motor 32 needs to be limited, including a state to be set due to overheating of the steered-side motor 32 or the inverter (not illustrated) provided in association with the steered-side motor 32. In this embodiment, the process of Step S60 is particularly effective in a situation in which the limiting state is set, a period required until the power output from the steered-side motor 32 is actually limited in the limiting state is longer than the threshold time TCth, and the state of "torque gradient R gradient threshold Rth1" can sufficiently be detected after an elapse of the threshold time TCth.

When the CPU 50 determines in Step S60 that the control state of the steered-side motor 32 is the limiting state (Step S60: YES), the CPU 50 determines that the torque gradient R is equal to or larger than the gradient threshold Rth1 due to the limiting state, and returns to the process of Step S10 to repeat the processes of Step S10 and afterwards.

When the CPU 50 determines that the control state of the steered-side motor 32 is not the limiting state (Step S60: NO), the CPU 50 detects the mechanical abnormality of the steering operation mechanism 6, and proceeds to the process of Step S40 to execute the process related to abnormality determination for determining the abnormality. In this case, similarly to the above, the CPU 50 controls the lighting condition to light or blink the alerting apparatus 61, and records abnormality information in the memory 51. Then, the CPU 50 proceeds to the process for activating the fail-safe operation in the event of mechanical abnormality.

Actions of this embodiment are described below. According to this embodiment, in Step S20 for determination on the magnitude of the torque gradient R, the gradient threshold Rth1 indicating a state in which the torque gradient R abruptly increases can be set as a value indicating a state in which the rack shaft 22 is presumed to be immovable though the motor torque is applied. The torque gradient R may abruptly increase in a state in which the rack shaft 22 cannot be moved though the motor torque is applied. The state in which the rack shaft 22 cannot be moved though the motor torque is applied includes a possibility that an abnormality occurs in the steering operation mechanism 6 and the rack shaft 22 cannot be moved mechanically. That is, the mechanical abnormality of the steering operation mechanism 6 can be detected in this embodiment.

Effects of this embodiment are described below. (1) This embodiment includes the process for determining whether the torque gradient R is equal to or larger than the gradient threshold Rth1 as in Step S20. Therefore, the mechanical abnormality of the steering operation mechanism 6 can be detected. Thus, the mechanical abnormality of the steering operation mechanism 6 can be detected in the steer-by-wire type steering system 1.

(2) The state in which the rack shaft 22 cannot be moved though the motor torque is applied includes a state in which the rack shaft 22 cannot be moved due to contact between the steered wheel 5 and an obstacle such as a curbstone. This state is unlikely to occur when the vehicle speed value V is larger than the low-speed value V0 including a stop of the vehicle.

This embodiment includes the process for determining whether the vehicle is traveling at a low speed including a stop as in Step S10. Therefore, it is possible to reduce erroneous determination that an abnormality occurs in the steering operation mechanism 6 because of the state in which the rack shaft 22 cannot be moved due to the contact between the steered wheel 5 and an obstacle such as a curbstone. Thus, this embodiment is effective in terms of an increase in the accuracy of the detection of the abnormality of the steering operation mechanism 6.

(3) The state in which the steered wheel 5 is in contact with an obstacle such as a curbstone can be estimated based on a track of the torque gradient R. In this embodiment, the gradient threshold Rth1 for use in Step S20 is set to the value larger than the gradient Rtha that depends on the characteristic that is based on the elastic component of the rubber of each steered wheel 5 and the characteristic that is based on the elastic component of the suspension of the vehicle to which each steered wheel 5 is connected. Therefore, it is possible to reduce, with higher accuracy, the erroneous detection of the abnormality of the steering operation mechanism 6 because of the state in which the rack shaft 22 cannot be moved due to the contact between the steered wheel 5 and an obstacle such as a curbstone. Thus, the accuracy of the detection of the abnormality of the steering operation mechanism 6 can be increased in this embodiment.

(4) The state in which the rack shaft 22 cannot be moved though the motor torque is applied includes a state that instantaneously occurs due to the influence of the road condition or the influence of the instantaneous contact between the vehicle and an obstacle such as a curbstone during traveling.

This embodiment includes the process for determining whether the torque gradient R is instantaneously equal to or larger than the gradient threshold Rth1 due to the influence of the road condition or the influence of the instantaneous contact between the vehicle and an obstacle such as a curbstone during traveling as in Step S50. Therefore, it is possible to reduce erroneous detection of the abnormality of the steering operation mechanism 6 because of the state in which the rack shaft 22 cannot instantaneously be moved due to the influence of the road condition or the influence of the instantaneous contact between the vehicle and an obstacle such as a curbstone during traveling. Thus, this embodiment is effective in terms of an increase in the accuracy of the detection of the abnormality of the steering operation mechanism 6.

(5) The state in which the rack shaft 22 cannot be moved though the motor torque is applied includes a state in which the rack shaft 22 cannot be moved due to the limitation on the power output from the steered-side motor 32. This state can be grasped based on the control state of the steered-side motor 32.

This embodiment includes the process for determining whether the torque gradient R is equal to or larger than the gradient threshold Rth1 due to the limiting state in which the power output from the steered-side motor 32 is limited as in Step S60. Therefore, it is possible to reduce erroneous determination that an abnormality occurs in the steering operation mechanism 6 because of the state in which the rack shaft 22 cannot be moved due to the limitation on the power output from the steered-side motor 32. Thus, this embodiment is effective in terms of an increase in the accuracy of the detection of the abnormality of the steering operation mechanism 6.

The embodiment described above may be modified as follows. Further, the following other embodiments may be combined together without causing any technical contradiction. For example, the process of Step S60 may be executed prior to Step S20 or Step S30, or the execution order may be changed. In a configuration in which the processes of Step S10 and afterwards are not executed in the limiting state of the steered-side motor 32, the process of Step S60 may be omitted.

For example, the process of Step S50 may be executed between Step S20 and Step S30, or the execution order may be changed. The process of Step S50 may be omitted in a case where there is no particular need to consider, for the detection of the mechanical abnormality of the steering operation mechanism 6, whether the abnormality instantaneously occurs due to the influence of the road condition or the influence of the instantaneous contact between the vehicle and an obstacle such as a curbstone during traveling.

The order of the process of Step S20 and the process of Step S30 may be changed. In the process of Step S30, the gradient threshold Rth2 may be changed as appropriate as long as the gradient threshold Rth2 has a value larger than the gradient threshold Rth1. The process of Step S30 may be omitted in a case where the process of Step S10 suffices to exclude the situation of whether the steered wheel 5 is in contact with an obstacle such as a curbstone.

In the process of Step S20, the torque change amount ΔItq of the actual current value Itq in a predetermined sampling period may be used in place of the torque gradient R. In this case, the torque change amount ΔItq is a value indicating a variation in the actual current value Itq in the predetermined sampling period and corresponding to the torque gradient R of the actual current value Itq.

For example, the process of Step S10 may be executed subsequently to Step S20 or Step S30, or the execution order may be changed. The process of Step S10 may be omitted in a case where the process of Step S30 suffices to exclude the situation of whether the steered wheel 5 is in contact with an obstacle such as a curbstone. That is, at least one of the processes of Step S10 and Step S30 is only needed to exclude the situation of whether the steered wheel 5 is in contact with an obstacle such as a curbstone.

The following configuration may be employed as the process for detecting the mechanical abnormality of the steering operation mechanism 6. When the process advances through the determination "Step S30: NO" instead of advancing through the determination "Step S30: YES", the process proceeds to Step S40, that is, the abnormality is determined under a condition that a count value is incremented or decremented every time the process advances through the determination "Step S30: NO" and the count value reaches a predetermined threshold.

The torque gradient R of the steered-side motor 32 may be detected by using, for example, a target steering operation torque that is a target value of the motor torque to be output, a detection result from an axial force sensor provided on the rack shaft 22, or a value that can be converted into the power output from the steered-side motor 32.

The alert for the driver via the alerting apparatus 61 may be changed as appropriate as long as the alert is issued by a method in which the driver can be aware of some change in the situation. Examples of the method include an alarm sound and an increase in the weight of the steering operation through an increase in the steering reaction force. In addition to the alert for the driver, a shop that can undertake maintenance of the vehicle, such as a dealer nearest to a current location, may be informed by using a communication function of the vehicle.

In the embodiment described above, the CPU 50 may be implemented as one or more processors configured to execute a computer program, one or more dedicated hardware circuits such as application-specific integrated circuits configured to execute at least a part of various processes, or a circuit including the processor and the dedicated hardware circuit in combination. The memory 51 may be any available medium accessible to a general or dedicated computer.

In the embodiment described above, the steering system 1 has a linkless structure in which the steering mechanism 4 and the steering operation mechanism 6 are constantly separated mechanically. The present disclosure is not limited to this structure. The steering system 1 may have a structure in which the steering mechanism 4 and the steering operation mechanism 6 are mechanically separable by a clutch.

What is claimed is:

1. A steering control apparatus configured to control a steering system having a structure in which a power transmission path between a steering mechanism and a steering operation mechanism is separated, the steering mechanism being steered by a driver, the steering operation mechanism including a motor configured to generate a motor torque serving as power for moving a steering operation shaft to turn a steered wheel of a vehicle, the steering control apparatus comprising
a controller configured to control driving of the motor to generate the motor torque, wherein:
the controller is configured to detect an abnormality of the steering operation mechanism when a value indicating a variation in the motor torque is a value indicating a state in which the steering operation shaft is presumed to be immovable though the motor torque is applied, and
the controller is configured to detect the abnormality of the steering operation mechanism when a vehicle speed of the vehicle is higher than a low vehicle speed that includes the vehicle being stopped.

2. The steering control apparatus according to claim 1, wherein the controller is configured to detect the abnormality of the steering operation mechanism through comparison between a value that is calculated as the value indicating the variation in the motor torque and that corresponds to a gradient of the variation and a gradient threshold defined to indicate the state in which the steering operation shaft is presumed to be immovable though the motor torque is applied.

3. The steering control apparatus according to claim 1, wherein the value indicating the state in which the steering operation shaft is presumed to be immovable though the motor torque is applied is set to a value larger than a value determined by a characteristic of a change in the motor torque that is estimated based on an elastic component of the steered wheel and an elastic component of the vehicle.

4. The steering control apparatus according to claim 1, wherein the controller is configured to detect the abnormality of the steering operation mechanism when the value indicating the variation in the motor torque continues, for a preset threshold time, to be the value indicating the state in which the steering operation shaft is presumed to be immovable though the motor torque is applied.

5. The steering control apparatus according to claim 1, wherein the controller is configured to detect the abnormality of the steering operation mechanism when a control state of the motor is not a limiting state in which power output from the motor is limited.

* * * * *